(12) United States Patent
He et al.

(10) Patent No.: US 12,263,973 B2
(45) Date of Patent: *Apr. 1, 2025

(54) FUSION WELDING DEVICE

(71) Applicant: TAIZHOU YONGPAI PACK EQUIPMENT CO., LTD., Taizhou (CN)

(72) Inventors: Yuhua He, Taizhou (CN); Shuibo Jiang, Taizhou (CN)

(73) Assignee: TAIZHOU YONGPAI PACK EQUIPMENT CO., LTD., Taizhou (CN)

( * ) Notice: Subject to any disclaimer, the term of this patent is extended or adjusted under 35 U.S.C. 154(b) by 255 days.

This patent is subject to a terminal disclaimer.

(21) Appl. No.: 17/917,073

(22) PCT Filed: Feb. 19, 2021

(86) PCT No.: PCT/CN2021/076809
§ 371 (c)(1),
(2) Date: Oct. 5, 2022

(87) PCT Pub. No.: WO2021/203844
PCT Pub. Date: Oct. 14, 2021

(65) Prior Publication Data
US 2023/0141063 A1    May 11, 2023

(30) Foreign Application Priority Data

Apr. 9, 2020  (CN) .......................... 202010273335.6
Apr. 9, 2020  (CN) .......................... 202020508215.5
Feb. 3, 2021  (CN) .......................... 202120322629.3

(51) Int. Cl.
*B65B 13/32*     (2006.01)
*B29C 65/06*     (2006.01)
(Continued)

(52) U.S. Cl.
CPC ............ *B65B 13/327* (2013.01); *B29C 65/06* (2013.01); *B29C 65/0681* (2013.01);
(Continued)

(58) Field of Classification Search
CPC ....... B65B 13/22; B65B 13/18; B65B 13/185; B65B 13/187; B65B 13/24; B65B 13/322;
(Continued)

(56) References Cited

U.S. PATENT DOCUMENTS 10,518,914 B2 *  12/2019  Neeser ................. B65B 13/025

FOREIGN PATENT DOCUMENTS

CN            210063463 U   *  2/2020

* cited by examiner

*Primary Examiner* — Carson Gross
(74) *Attorney, Agent, or Firm* — MUNCY, GEISSLER, OLDS & LOWE, P.C.

(57) ABSTRACT

A fusion welding device, comprising an operating component, a fusion welding work motor, a fusion welding work moving assembly, and a fusion welding work fixed assembly, the fusion welding work motor being connected with the fusion welding work moving assembly by means of a transmission mechanism. The fusion welding device is provided with a central connection component that is able to rotate, and the central connection component is provided with a first input position, a second input position, and a locking structure connection position. The present fusion welding device is able to accomplish automatic band pressing and fusion welding work by means of a relatively simple structure and by means of differently transmitted front and back connections and changes in engagement.

9 Claims, 5 Drawing Sheets

(51) Int. Cl.
  *B65B 13/18*  (2006.01)
  *B65B 13/22*  (2006.01)
  *B65B 13/24*  (2006.01)
  *B65B 65/02*  (2006.01)

(52) U.S. Cl.
  CPC ............ *B65B 13/187* (2013.01); *B65B 13/24* (2013.01); *B65B 65/02* (2013.01); *B65B 13/22* (2013.01)

(58) Field of Classification Search
  CPC ... B65B 13/327; B29C 66/1122; B29C 65/06; B29C 65/0681
  See application file for complete search history.

FUSION WELDING DEVICE

FIELD OF THE INVENTION

The present invention relates to a fusion welding device, in particular to a fusion welding device of a packing belt of a hand-held baler.

BACKGROUND OF THE INVENTION

There is a way of bonding the belts, for example, using PET or PP strapping tape to bundle products or packages in a handheld electric baler, and then tightening and bonding the tape, which is to bond the two parts that need to be bonded through the way of frictional heating. For a hand-held baler, it is always intended to complete a serried of actions through the automatic operation of the machine with few operations, and the structure of the machine is preferably as simple as possible, rationally arranged, light and beautiful.

SUMMARY OF THE INVENTION

The technical problem to be solved by the present invention is to provide a fusion welding device, which can be applied to a hand-held baler to weld the baling belt, and is simple in operation and structure. In order to achieve the object, the present invention adopts the following technical solutions:

A fusion welding device, comprising an operating component, a fusion welding work motor, a fusion welding work moving assembly, and a fusion welding work fixed assembly, the fusion welding work motor being connected with the fusion welding work moving assembly by means of a transmission mechanism; the fusion welding device is provided with a central connection component that is able to rotate, and the central connection component is provided with a first input position, a second input position, and a locking structure connection position;

The first input position, on the basis of an operation on the operating component, causes the central connection component to produce a rotation in a first direction;

The second input position is transmissively connected to a clutch of the fusion welding work motor, and the fusion welding work motor is able to drive, by means of an output component, the second input position to produce a rotation in a second direction, and thereby drive the central connection component to rotate in the second direction, and after rotating to a set angle, the two disengage, said set angle corresponding to the angle of rotation required for the fusion welding work moving assembly to move to a fusion welding working location.

Further, the second input position is a sector gear, and the output component is a gear.

Further, the fusion welding device is provided with a fusion welding working state locking structure of a fusion welding work moving assembly, the locking structure is arranged obliquely, and the upper end thereof is rotatably connected to the locking structure locking structure connection position, the axis of rotation is parallel to the axis of rotation of the central connection component, and the lower end thereof is connected with the fusion welding work moving assembly; the fusion welding device is provided with a limiting structure to limit the maximum rotation angle of the central connection component in the second direction; the fusion welding device is configured such that the locking structure is in a locked state when the fusion welding work is performed, and the second input position and the output component are in a disengaged state, and the central connection component maintains a tendency to rotate in a second rotational direction, so that the fusion welding work moving assembly is not lifted up, before the fusion welding work starts, the fusion welding work moving assembly is in a lifted state, the locking structure is in a non-locked state, and the second input position and output component am in a connected state.

Further, the fusion welding working state locking structure comprises an upper assembly and a lower assembly, the upper assembly is rotatably connected with the locking structure connection position, and the lower assembly is connected with the fusion welding work moving assembly; a compression spring is provided between the upper assembly and the lower assembly, and a length adjusting component is provided for one of the upper assembly and the lower assembly, and an inserting connection component mated with the length adjusting component is provided for the other, the fusion welding device is provided with a limiting structure to limit the maximum rotation angle of the central connection component rotating to the second direction; The locking structure, the fusion welding work moving assembly, and the central connection component am configured such that when the fusion welding work is performing, the locking structure is in a locked state, and the second input position and the output component are in a disengaged state, and the central connection component remains the tendency to rotate in the second rotation direction, the axis of rotation for the rotational connection between the locking structure and the locking structure connection position is outside the first side of the plane; before the fusion welding work starts, the fusion welding work moving assembly is in a lifted state, the locking structure is in a non-locked state, the axis of rotation for the rotational connection between the locking structure and the locking structure connection position is outside the second side of the plane, and the second input position and the output component are in a connected state; the plane is the plane that passes through the axis of rotation of the central connection component and the axis of rotation for the rotational connection between the fusion welding work moving assembly and the locking structure.

Further, the fusion welding work moving assembly comprises a fusion welding working component and a fusion welding working power input connection component, and the fusion welding working component and the fusion welding working power input connection component am hinged, the fusion welding working power input connection component is connected with one end of the transmission mechanism by means of an eccentric structure, and the other end of the transmission mechanism is connected with an output end of the fusion welding work motor, the fusion welding working component is slidably connected to a guide rail on the mounting frame; the hinge axis of the fusion welding working component and the fusion welding working power input connection component is parallel to the axis of rotation of the mounting frame.

Further, the fusion welding work motor and the transmission mechanism are in a one-way transmission connection relationship, when the second input position of the central connection component and the output component are in a connected state and move in the first direction, the fusion welding work motor and the transmission mechanism am in a drive disengagement connection, and the fusion welding work motor does not drive the transmission mechanism.

Further, the fusion welding work moving assembly comprises a mounting frame top spring arranged between the mounting frame and the mounting base.

The operating component is a rotary operating handle assembly, and the axis of rotation thereof is parallel to the axis of rotation of the tension wheel of the fusion welding device; the operating handle assembly comprises the operating handle and is combined with a pawl and a gear that rotate synchronously with the operating handle to prevent the tension wheel from rotating in the reverse direction during operation, a swing rod is arranged between the first input position and the operating handle assembly, and the end of the swing rod is mated with the first input position, and the swing rod is provided with gears to engage with the gears on the operating handle.

The first input position is configured such that the position of the central connection component at the rotational limit position in the second direction can receive an input external force when the operating component is operated, to cause the central connection component to generate a reset rotation in the first direction.

Due to the adoption of the technical solutions of the present invention, the present fusion welding device is able to accomplish automatic band pressing and fusion welding work by means of a relatively simple structure and by means of differently transmitted front and back connections and changes in engagement.

DETAILED DESCRIPTION

Figure 1:
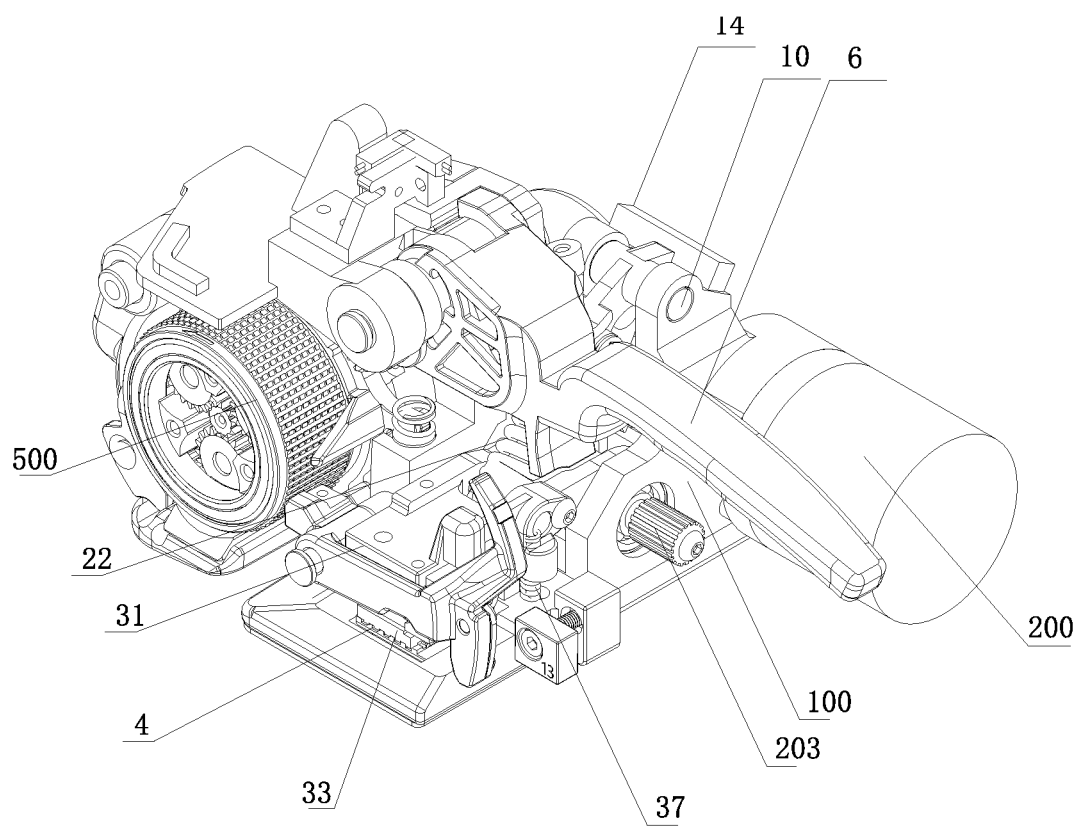
FIG. 1 is a structural schematic diagram I according to an embodiment of a hand-held baler of the present invention.
Figure 2:
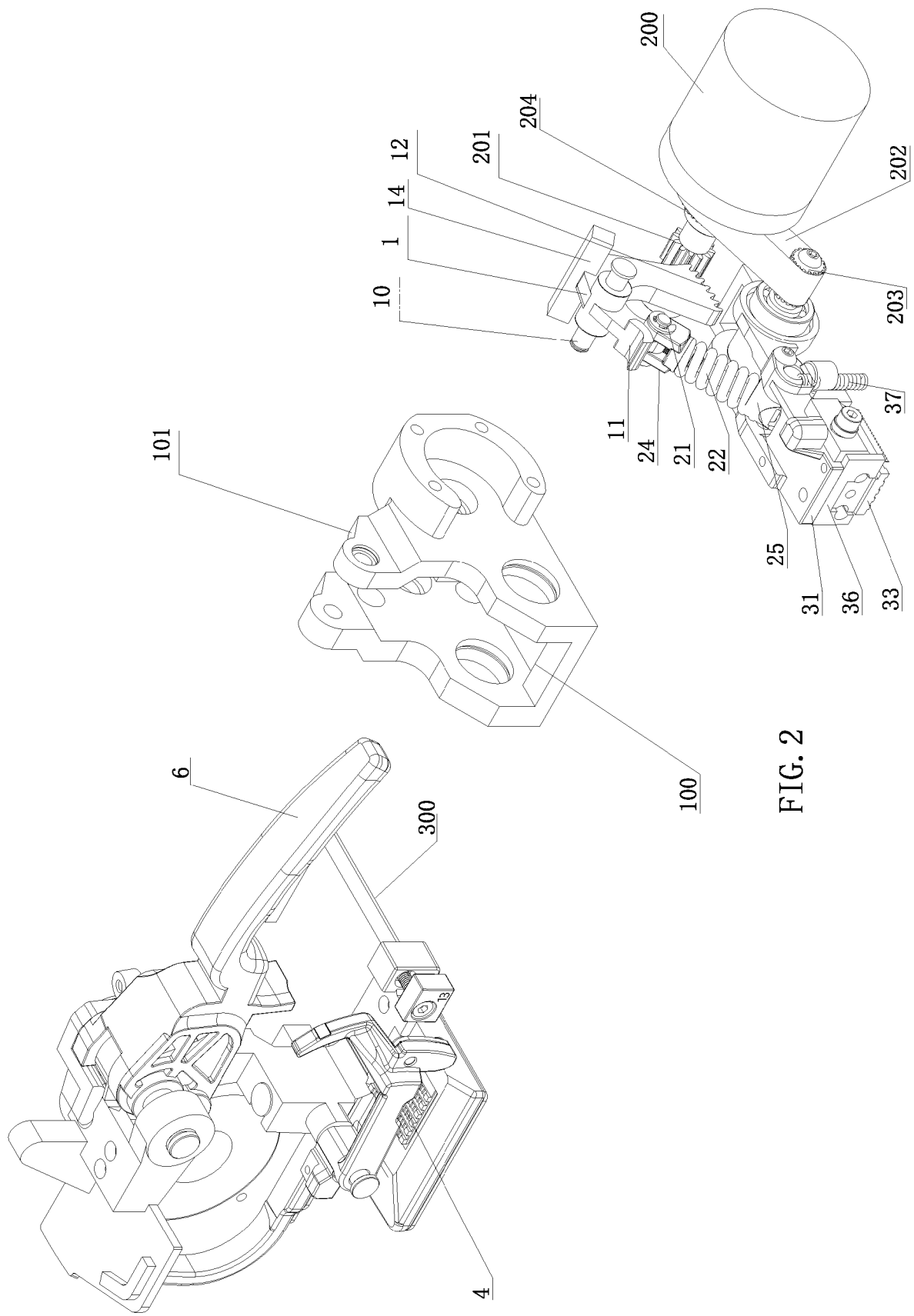
FIG. 2 is an exploded view of a structure according to an embodiment of a hand-held baler of the present invention.
Figure 3:
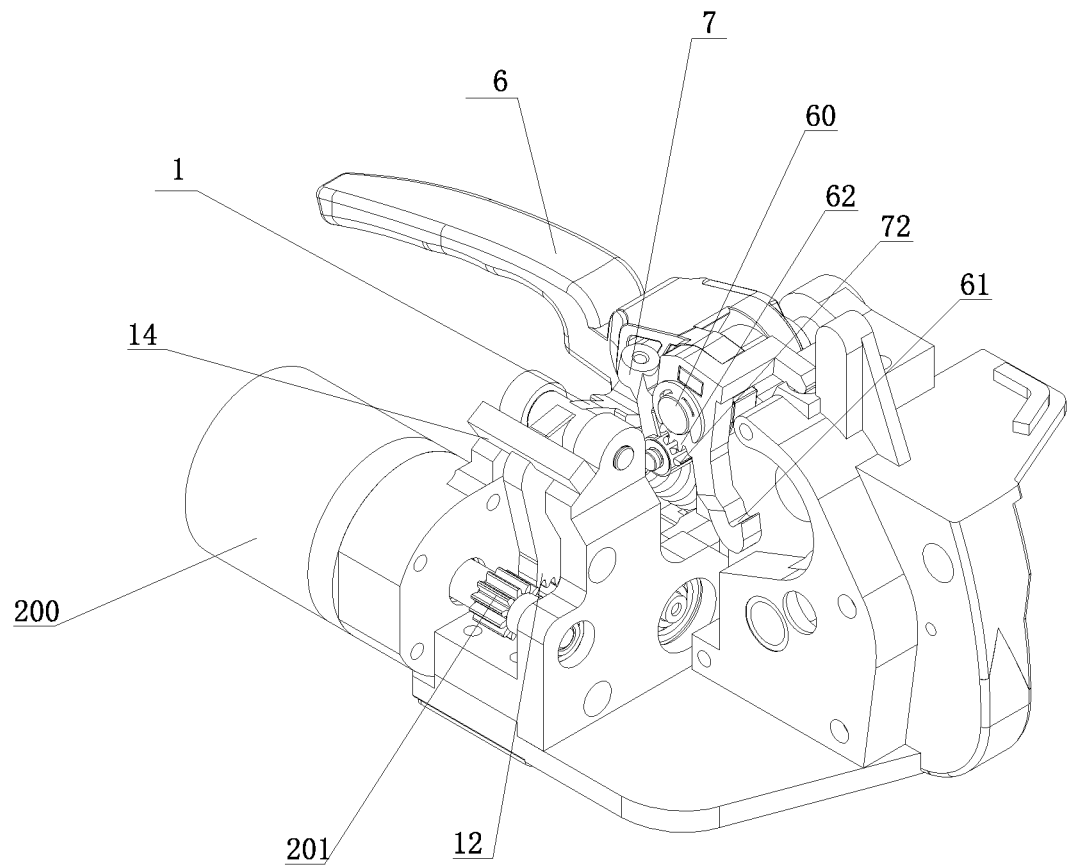
FIG. 3 is a structural schematic diagram II according to an embodiment of a hand-held baler of the present invention.
Figure 4:
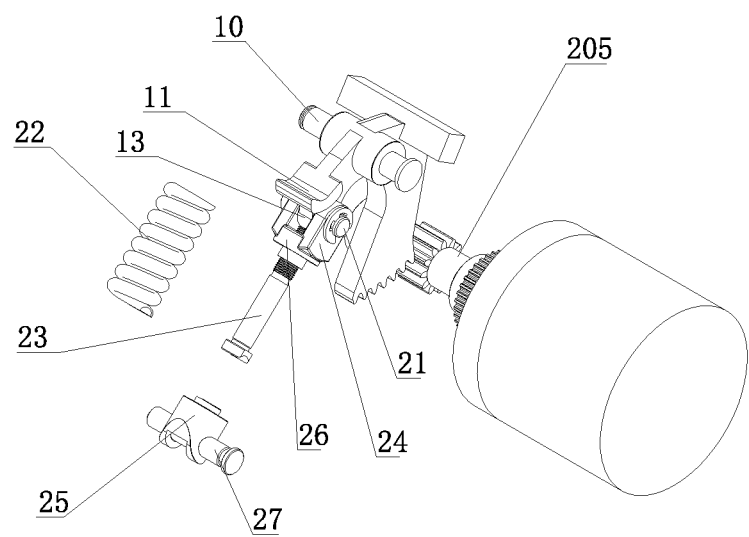
FIG. 4 is a further exploded view of a partial structure according to the embodiment of the hand-held baler of the present invention on the basis of FIG. 2.

Referring to the figures, a fusion welding device of the present invention comprises a rotatable operating handle assembly, a fusion welding work motor 200, a fusion welding work moving assembly, and a fusion welding work fixed assembly; the fusion welding work motor is connected with the fusion welding work moving assembly by means of a transmission mechanism; the fusion welding device is provided with a central connection component 1 which is rotatably connected to a fixed mounting base 100, and the reference numeral 10 is a rotating shaft of the central connection component. The central connection component is provided with a first input position 11, a second input position 12, and a locking structure connection position 13. The mounting base 100 is mounted on a base 300 of a hand-held baler.

Figure 5:
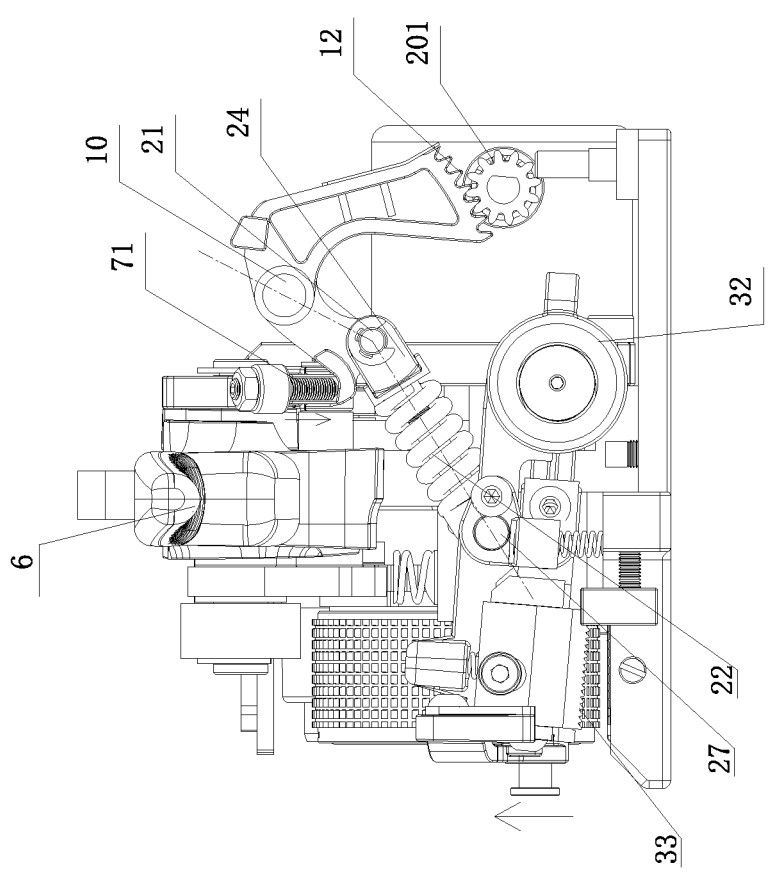
FIG. 5 is a schematic diagram illustrating that a fusion welding work motor preparing starts to work after the handle is lifted according to an embodiment of a hand-held baler of the present invention.
Figure 7:
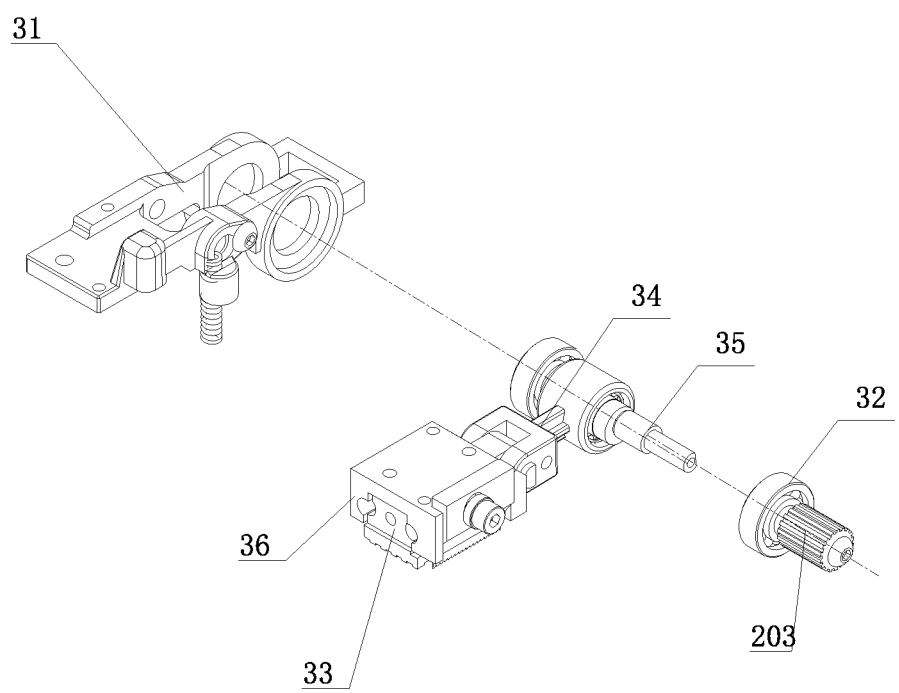
FIG. 7 is an exploded view of a structure of a fusion welding work moving assembly according to an embodiment of a hand-held baler of the present invention.

The first input position 11, on the basis of the operation of the operating handle assembly, causes the central connection component 1 to produce a rotation in a first direction, i.e., the counterclockwise direction in FIG. 5.

Figure 6:
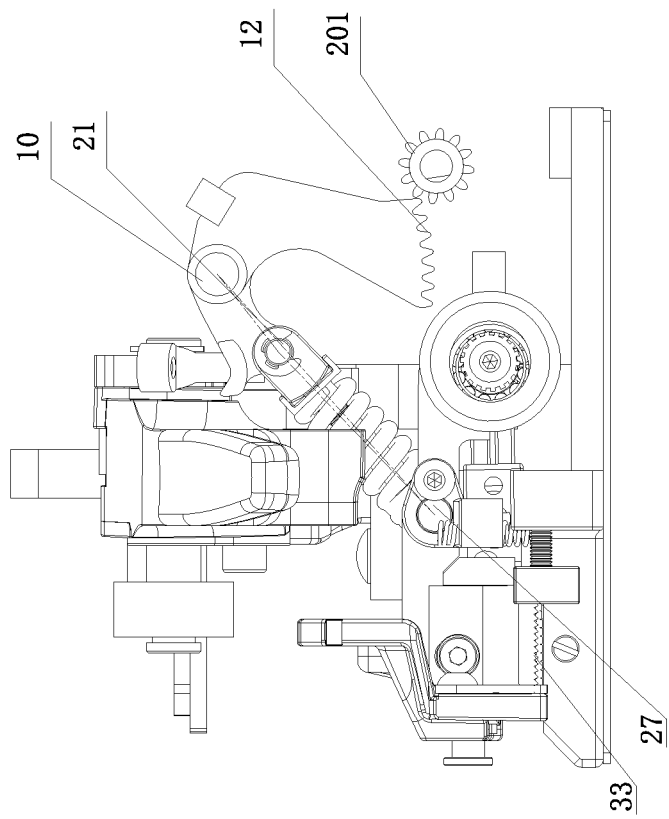
FIG. 6 is a schematic diagram when the fusion welding work is performed according to an embodiment of a hand-held baler of the present invention.

The second input position 12 adopts a sector gear and is transmissively connected to a clutch of the output component 201 of the fusion welding work motor 200. The output component 201 adopts a gear and is mounted on the motor output shaft 205. The fusion welding work motor 200 can drive the second input position 12 to produce a rotation in a second direction (that is, the clockwise direction in FIG. 6) by means of an output component 201, and thereby drive the central connection component 1 to rotate in the second direction as a whole, and after rotating to a set angle, the two disengage, said set angle corresponding to the angle of rotation required for the fusion welding work moving assembly to move to a fusion welding working location (that is, moving from the angle of FIG. 5 to the angle of FIG. 6). Due to the adoption of the sector gear, the clutch timing and rotation angle are controlled by determining the sector angle of the gear, the structure is simple, and the clutch operation is reliable and stable.

The fusion welding device is provided with a fusion welding working state locking structure of the fusion welding work moving assembly, the locking structure is arranged obliquely, the upper end of the locking structure and the locking structure connection position 13 are hinged by means of the shaft 21, the shaft 21 is parallel to the shaft 10, the lower end of the locking structure is rotatably connected to the fusion welding work moving assembly; the fusion welding device is provided with a limiting structure to limit the maximum rotation angle of the central connection component 1 in the second direction when the fusion welding work is performed. At the maximum rotation angle, the sector gear and the output component have been disengaged, the limiting structure is composed of the gear 101 on the frame of the hand-held baler and the stop block 14 on the central connection component 1. The locking structure and the pressing and locking output connection component 13 for the fusion welding work are configured such that the central connection component 1 has a tendency to rotate in the first rotation direction before the fusion welding work motor starts to work, and cause the central connection component 1 to keep the tendency to rotate in the second rotational direction and is pressed against the gear 101 of the limiting structure when the fusion welding work is performing.

The preferred structure of the above locking structure is that the locking structure is composed of an upper assembly and a lower assembly, the upper assembly is provided with a first connection component 24, and the connection component 24 and pressing and locking output connection component 13 for the fusion welding work am hinged by means of a shaft 21; the second connection component 25 is provided on the lower assembly, and the second connection component 25 is rotatably connected with the fusion welding work moving assembly. A compression spring 22 is provided between the upper assembly and the lower assembly. The first connection component in the upper assembly is provided with a nut 26 and is connected with the length adjusting component 23 by threaded connection, and the length adjusting component 23 is inserted into the second connection component 25. The locking structure, the fusion welding work moving assembly, and the central connection component 1 am configured such that when the fusion welding work is performing (FIG. 6), the locking structure is in a locked state, and the second input position 12 and the output component 201 are in a disengaged state, the central connection component 1 maintains a tendency to rotate in the second rotational direction, and the axis of rotation for the rotational connection between the locking structure and the locking structure connection position 13 is outside the first side of the plane; before the fusion welding work starts (FIG. 5), the fusion welding work moving assembly is in a lifted state, the locking structure is in a non-locked state, the axis of rotation for the rotational connection between the locking structure and the locking structure connection position is outside the second side of the plane, and the second input position and the output component 201 are in a connected state; the plane is the plane that passes through the axis of rotation of the central connection component and the axis of rotation for the rotational connection between the fusion welding work moving assembly and the locking structure, and the first side and the second side are divided into the front and back sides of the plane.

The fusion welding work moving assembly comprises a mounting frame 31, the mounting frame 31 is rotatably mounted on the mounting base 100 by means of a bearing 32, and the mounting frame 31 is also connected with the central connection component by means of the fusion welding working state locking structure; specifically, the mounting frame 31 is rotatably connected with the second connection component 25 by means of the pin shaft 27. In this way, the rotation of the central connection component 1 in the second direction causes the fusion welding work moving assembly to rotate to the angle of the fusion welding work by means of the locking structure and is locked without reverse rotation.

The fusion welding work moving assembly comprises a top spring 37 for the arrangement of the mounting frame between the mounting frame 31 and the mounting base 100.

The axis of rotation of the operating handle assembly is parallel to the axis of rotation of the tension wheel 500 of the fusion welding device; the operating handle assembly comprises the operating handle 6, the reference numeral 60 is the rotating shaft of the handle, the operating handle 6 is connected with pawl 61 and a gear 62 that rotate synchronously with the operating handle to prevent the tension wheel from rotating in the reverse direction during operation, a swing rod 7 is arranged between the first input position 11 and the operating handle assembly, and the end of the swing rod 7 is mated with the first input position 11 by fixing the connection component 71 (for example, bolt threaded to the end of the swing rod), and the swing rod 7 is provided with gears 72, the gears 72 are mounted on the base 300; the gears 72 engage with the gears 62 on the operating handle 6; when the operating handle is rotating, the swing rod 7 is moved by means of the gear connection structure.

The fusion welding work moving assembly comprises a fusion welding working component 33 and a fusion welding working power input connection component 34, the fusion welding working component 33 and the connection component 34 are hinged, and the fusion welding working power input connection component 34 is connected with one end of the transmission mechanism 202 by means of an eccentric shaft 35; the transmission mechanism 202 can be a belt transmission mechanism, the eccentric shaft 35 is connected with the driven wheel 203 of the transmission mechanism, and the driving wheel 204 of the transmission mechanism is connected with the output shaft 205 of the fusion welding work motor, the fusion welding working component 33 is slidably connected to the guide rail 36 on the mounting frame 31, and a snap-fit ball can be provided in the are groove between their sides, and the fusion welding working component 33 is slidably connected to the guide rail 36; the hinge axes of the fusion welding working component 33 and the fusion welding working power input connection component 34 are parallel to the axis of rotation of the mounting frame 31 and am also parallel to the eccentric shaft 35.

The fusion welding work motor 200 and the transmission mechanism 202 are in a one-way transmission connection relationship, when the second input position 12 of the central connection component 1 and the output component 201 are in a connected state (gear meshing state in this embodiment) and move in the first direction, the fusion welding work motor 200 and the transmission mechanism 202 are in a drive disengagement connection, and the fusion welding work motor 200 does not drive the transmission mechanism 202. This can be connected by means of a one-way bearing in the corresponding direction between the driving wheel 204 and the output shaft 205 of the fusion welding work motor.

The fusion welding work fixed assembly is a stationary structure at the bottom of the hand-held baler, and a fixed friction structure 4 is arranged on the upper surface. The fusion welding working component 33 is mated with the fixed friction structure 4, and causes the joints of the packing belt to be heated and welded by friction.

When working, after the previous packing belt joint is welded, the handle 6 is lifted, at this time, the handle assembly rotates, the pawl 61 automatically releases the one-way locking of the tensioning device of the hand-held baler by rotating, and at the same time, the gear 62 drives the gear 72 on the swing rod 7 to rotate, the swing rod 7 is pressed down, and the connection component 71 at its end also acts downward on the first input position 11. As can be seen from the figure, the swing rod 7 is also obliquely intersected with each axis of rotation on the vertical projection of the plane, so that the swing rod plays a turning role. Therefore, the operating component adopts the aforesaid the structure, and the combination of the aforesaid relevant rotational relationships and directions can automatically associate the tensioning structure and the welding structure, and the work is more reliable and the operation is convenient, and the structure arrangement is more uniform and reasonable, which conforms to ergonomics.

After the first input position 11 is subjected to the aforesaid actions, the whole central connection component 1 rotates in the first direction (counterclockwise direction in FIG. 5), thus, the second input position 12 rotates to the position shown in FIG. 5. However, due to the one-way transmission connection relationship between the fusion welding work motor 200 and the transmission mechanism 202, the output component 201 is engaged with the second input position 12 at this time, but the transmission mechanism does not rotate in the opposite direction. After the locking structure connection position 13 is rotated in the first direction, the axis of rotation between the inclined locking structure and the locking structure connection position 13 also rotates to the outside of the second side of the aforementioned plane, thereby releasing the locking, the mounting frame 31 can be rotated and lifted in a state as shown in FIG. 5. The bonded packing belt can be removed, and the packing belt that needs to be packed and welded can be put in at the same time.

After the packing belt is tightened, the fusion welding work motor 200 receives the signal and starts to work, so that the output component 201 is driven to rotate, the second input position 12 is driven to rotate in the second direction, and thus the entire central connection component 1 is driven to rotate in the second direction. The axis of rotation between the inclined locking structure and the locking structure connection position 13 also rotates outside of the first side of the aforesaid plane to achieve locking, in this state the compression spring 22 causes the central connection component 1 to maintain a tendency to rotate in the second direction, so that the stop block 14 is pressed against the gear 101 of the limiting structure, and under the action of the compression spring 22, the mounting frame is pressed down to the angle of fusion welding work, thereby realizing locking.

At the same time, the fusion welding work motor 200 drives the fusion welding working component 33 to move back and forth under the guidance of the guide rail 36 by means of the transmission mechanism 202, the eccentric shaft 35, and the fusion welding working power input connection component 34 to perform the fusion welding work.

At this time, since the sector gear has been disengaged from the output component 201 (FIG. 6) and the state is maintained by the locking structure, the central connection component 1 maintains a normal working state without being interfered.

When the welding is finished, the handle is lifted again to repeat the above process.

In addition, the output component 201 (hereinafter referred to as the motor output gear) is provided with a shaft hole, the motor output shaft 205 of the fusion welding work motor 200 is inserted into the shaft hole, and a torsion spring is provided between the motor output shaft and the motor output gear, them is a spacing in the circumferential direction between the output shaft and the motor output gear. The motor output shaft is provided with a first driving position to drive the sector gear of the second input position to rotate in the second direction.

The working direction of the torsion spring is such that after the sector gear of the second input position rotates at a certain angle and is disengaged from the motor output gear, and when the motor output shaft stops rotating, the motor output gear is driven to continue to rotate, to cause the motor output gear to disengage from the connection with the first driving position. The motor output shaft is provided with a second limiting position.

The part where the motor drive shaft is connected with the motor output gear is a flat shaft, the motor shaft hole of the motor output gear is provided with a protrusion, and is mated with the first driving position and the second limiting position of the motor output shaft on the both sides of the protrusion respectively. After the torsion spring is disengaged from the motor output gear after the sector gear of the second input position rotates by a certain angle, when the motor output shaft stops rotating, the motor output gear is driven to continue to rotate, so that the motor output gear is disengaged from the connection with the first driving position, and switches to contact with the second limiting position.

The central angle corresponding to the spacing is smaller than the angle between adjacent teeth of the sector gear of the first input position.

The end face of the motor output gear is provided with a torsion spring connecting hole, the torsion spring is sleeved on the flat shaft, one end of the torsion spring is connected with the torsion spring connecting hole, and the torsion spring is provided with a flat spring coil matching the shape of the flat shaft, and is connected with the flat shaft.

When the sector gear of the second input position is rotated in the reset direction, the motor output gear can have a certain rotation angle relative to the motor output shaft through the spacing in the circumferential direction and the torsion spring, which has a wide range of adaptability and avoids the stuck phenomenon between the sector gear of the second input position and the motor output gear, and ensures the automatic connection of the overall work of the handheld baler.

The above description only describes the specific embodiments of the present invention, but the structural features of the present invention are not limited thereto. Any changes or modifications made by those skilled in the art within the field of the present invention shall fall within the scope of protection of the present invention.

The invention claimed is:

1. A fusion welding device comprising:
an operating component;
a fusion welding work motor;
a fusion welding work moving assembly; and
a fusion welding work fixed assembly,
wherein the fusion welding work motor is connected with the fusion welding work moving assembly by means of a transmission mechanism,
wherein the fusion welding device is provided with a central connection component that is able to rotate, and the central connection component is provided with a first input element, a second input element, and a locking structure connection element;
the first input element on basis of an operation on the operating component, causes the central connection component to produce a rotation in a first direction;
the second input element is transmissively connected to a output component of the fusion welding work motor, and the fusion welding work motor is able to drive, by means of the output component, the second input element to produce a rotation in a second direction, and thereby drive the central connection component to rotate in the second direction, and after rotating to a set angle, the second input element and the output component disengage, said set angle corresponding to an angle of rotation required for the fusion welding work moving assembly to move to a fusion welding working location,
wherein the second input element is a sector gear, and the output component is a gear.

2. The fusion welding device according to claim 1, wherein the fusion welding device is provided with a fusion welding working state locking structure of the fusion welding work moving assembly, and an upper end thereof is rotatably connected to the locking structure connection element an axis of rotation of the upper end of the locking structure is parallel to an axis of rotation of the central connection component, and a lower end thereof is connected with the fusion welding work moving assembly; the fusion welding device is provided with a limiting structure to limit a maximum rotation angle of the central connection component in the second direction; the fusion welding device is configured such that the locking structure is in a locked state when a fusion welding work is performed, and the second input element and the output component are in a disengaged state, and the central connection component maintains rotating in the second direction, so that the fusion welding work moving assembly is not lifted up, before the fusion welding work starts, the fusion welding work moving assembly is in a lifted state, the locking structure is in a non-locked state, and the second input element and output component are in a connected state.

3. A fusion welding device according to claim 1, wherein the fusion welding working state locking structure comprises an upper assembly and a lower assembly, the upper assembly is rotatably connected with the locking structure connection element and the lower assembly is connected with the fusion welding work moving assembly; a compression spring is provided between the upper assembly and the lower assembly, and a length adjusting component is provided for one of the upper assembly and the lower assembly; the fusion welding device is provided with a limiting structure to limit a maximum rotation angle of the central connection component rotating to the second direction;

the locking structure, the fusion welding work moving assembly, and the central connection component are configured such that when L fusion welding work is performing, the locking structure is in a locked state, and the second input element and the output component are in a disengaged state, and the central connection component remains rotating in the second rotation direction, the axis of rotation for the rotational connection between the locking structure and the locking structure connection element is outside a first side of the plane; before the fusion welding work starts, the fusion welding work moving assembly is in a lifted state, the locking structure is in a non-locked state, the axis of rotation for the rotational connection between the locking structure and the locking structure connection element is outside L second side of the plane, and the second input element and the output component are in a connected state; the plane is the plane that passes through the axis of rotation of the central connection component and the axis of rotation for the rotational connection between the fusion welding work moving assembly and the locking structure.

4. The fusion welding device according to claim 1, wherein the fusion welding work moving assembly comprises a mounting frame, the mounting frame is rotatably mounted on a mounting base, and the mounting frame is further connected with the central connection component by means of the fusion welding working state locking structure, the rotation of the central connection component in the second direction causes the fusion welding work moving assembly to rotate to an angle for a fusion welding work by means of the locking structure.

5. The fusion welding device according to claim 1, wherein the fusion welding work moving assembly comprises a fusion welding working component and a fusion welding working power input connection component, and the fusion welding working component and the fusion welding working power input connection component are hinged, the fusion welding working power input connection component is connected with one end of the transmission mechanism by means of an eccentric structure, and the other end of the transmission mechanism is connected with an output end of the fusion welding work motor; the fusion welding working component is slidably connected to a guide rail on L mounting frame; the hinge axis of the fusion welding working component and the fusion welding working power input connection component is parallel to an axis of rotation of the mounting frame.

6. The fusion welding device according to claim 1, wherein the fusion welding work motor and the transmission mechanism are in a one-way transmission connection relationship, when the second input element of the central connection component and the output component are in a connected state and move in the first direction, the fusion welding work motor and the transmission mechanism are in a drive disengagement connection, and the fusion welding work motor does not drive the transmission mechanism.

7. The fusion welding device according to claim 1, wherein the fusion welding work moving assembly comprises a mounting frame top spring arranged between mounting frame and a mounting base.

8. The fusion welding device according to claim 1, wherein the operating component is a rotary operating handle assembly, and the axis of rotation thereof is parallel to an axis of rotation of the tension wheel of the fusion welding device; the operating handle assembly comprises an operating handle and is combined with a pawl and a gear that rotate synchronously with the operating handle to prevent the tension wheel from rotating in a reverse direction during operation, a swing rod is arranged between the first input element and the operating handle assembly, and the end of the swing rod is mated with the first input element and the swing rod is provided with gears to engage with ears on the operating handle.

9. The fusion welding device of claim 1, wherein the first input element is configured such that a position of the central connection component at a rotational limit position in the second direction can receive an input external force when the operating component is operated, to cause the central connection component to generate a reset rotation in the first direction.

\* \* \* \* \*